United States Patent [19]

Mezger et al.

[11] Patent Number: 5,726,352
[45] Date of Patent: Mar. 10, 1998

[54] METHOD OF DETECTING MISFIRES IN A MULTICYLINDER INTERNAL COMBUSTION ENGINE

[75] Inventors: Manfred Mezger, Markgröningen; Asmus Volkart, Bietigheim-Bissingen; Klaus Ries-Müller, Bad Rappenau; Rainer Frank, Sachsenheim; Sigrid Hafner, Stuttgart, all of Germany

[73] Assignee: Robert Bosch GmbH, Stuttgart, Germany

[21] Appl. No.: 649,170

[22] Filed: May 17, 1996

[30] Foreign Application Priority Data

May 19, 1995 [DE] Germany ............... 195 18 411.4

[51] Int. Cl.$^6$ .................................................. G01M 15/00
[52] U.S. Cl. ........................................................ 73/117.3
[58] Field of Search ............................ 73/117.3, 35.03, 73/35.06, 116, 117.2; 123/419, 436; 364/431.07

[56] References Cited

U.S. PATENT DOCUMENTS

| | | | |
|---|---|---|---|
| 5,200,899 | 4/1993 | Ribbens et al. | 73/117.3 |
| 5,239,473 | 8/1993 | Ribbens et al. | 73/117.3 |
| 5,495,415 | 2/1996 | Ribbens et al. | 73/117.3 |
| 5,505,079 | 4/1996 | Rossignol | 73/117.3 |
| 5,522,258 | 6/1996 | Hafner | 73/117.3 |
| 5,576,963 | 11/1996 | Ribbens et al. | 73/117.3 |

FOREIGN PATENT DOCUMENTS 4138765  7/1992  Germany.

*Primary Examiner*—Elizabeth L. Dougherty
*Assistant Examiner*—Eric S. McCall
*Attorney, Agent, or Firm*—Walter Ottesen

[57] ABSTRACT

The invention is directed to a method for detecting combustion misfires in a multicylinder internal combustion engine. The method includes the steps of: detecting the time span ts(i) in which the crankshaft of the engine passes through a pregiven angular range ($\phi$) for each ignition of the engine; computing a vector element Lut(i) for the rough running of the engine based on at least one detected time span ts(i) for each ignition (i) of the engine; forming a vector $\overline{LUT}(i)$ from at least two vector elements Lut(i), Lut(j) with the two vector elements Lut(i), Lut(j) being for each ignition (i); computing the spacing between the vector $\overline{LUT}(i)$ and at least one predetermined reference vector $\overline{Rn}$ and $\overline{Ra}$; and, detecting a combustion misfire when the spacing satisfies a predetermined condition.

11 Claims, 3 Drawing Sheets

METHOD OF DETECTING MISFIRES IN A MULTICYLINDER INTERNAL COMBUSTION ENGINE

FIELD OF THE INVENTION

The invention relates to a method for detecting combustion misfires in an internal combustion engine as it is used as a drive unit in motor vehicles.

BACKGROUND OF THE INVENTION

Combustion misfires lead to an increase of the toxic substances emitted during operation of the engine and can, in addition, lead to damage of the catalytic converter in the exhaust-gas system of the engine. A detection of combustion misfires in the entire rpm and load ranges is necessary to satisfy statutory requirements as to on-board monitoring of exhaust-gas relevant functions. In this context, it is known that, during operation with combustion misfires, characteristic changes occur in the rpm curve of the engine compared to normal operation without misfires. Normal operation without misfires and operation with misfires can be distinguished from a comparison of these rpm curves.

A method operating on this basis is already known and disclosed in German patent publication 4,138,765 which corresponds to U.S. patent application Ser. No. 08/818,884, filed Jan. 10, 1992, and now abandoned.

In accordance with this known method, a crankshaft angle range characterized as a segment is assigned to each cylinder. The segment time is the time that it takes the crankshaft to pass through this angular range. The segment time is dependent, inter alia, on the energy converted in the combustion stroke. Misfires lead to an increase of the ignition-synchronously detected segment times. According to the known method, a measure for the rough running of the engine is computed from the differences of the segment times. In addition, slow dynamic operations are compensated by computer. Such slow dynamic operations are, for example, the increase in the engine rpm (engine speed) when the motor vehicle is accelerated. A rough-running value, which is computed in this way for each ignition, is likewise compared to a predetermined threshold value in synchronism with the ignition. Exceeding this threshold value is evaluated as a misfire. The threshold value can be dependent on operating parameters such as load and rpm.

The reliability with which the misfire can be detected with this method decreases the less individual misfires operate on the rpm of the crankshaft. The reliability therefore drops with an increasing number of the cylinders of the engine and with increasing rpm as well as with reducing load.

SUMMARY OF THE INVENTION

In view of this background, it is an object of the invention to provide a method which further improves the reliability of detecting misfires in internal combustion engines having a high number of cylinders even when high rpms and reduced loads are present.

The method of the invention is for detecting combustion misfires in a multicylinder internal combustion engine. The method includes the steps of: detecting the time span ts(i) in which the crankshaft of the engine passes through a pregiven angular range ($\phi$) for each ignition of the engine; computing a vector element Lut(i) for the rough running of the engine based on at least one detected time span ts(i) for each ignition (i) of the engine; forming a vector $\overline{LUT}$(i) from at least two vector elements Lut(i), Lut(j) with the two vector elements Lut(i), Lut(j) being for each ignition (i); computing the spacing between the vector $\overline{LUT}$(i) and at least one predetermined reference vector $\overline{Rn}$ and $\overline{Ra}$; and, detecting a combustion misfire when the spacing satisfies a predetermined condition.

Significant elements of the method of the invention lie, on the one hand, in the use of a vector variable as the rough-running test variable. This means that in lieu of the comparison of two values, a comparison is made of two or more multi-dimensional vectors with one vector being formed for each ignition from actually measured segment times. This vector is then compared to at least one reference vector which, for example, is characteristic for misfire operation or normal operation. The reference vectors are, for example, empirically determined for individual operating points and stored in characteristic fields. In this way, the known one-dimensional comparison of a rough-running test quantity to a threshold value is expanded to a multi-dimensional comparison. However, this expansion to several dimensions increases the reliability of the misfire detection in critical load/rpm ranges only when the reference vector in each case is well adapted to the actual operating point defined by load and rpm.

The vectorial formation of the rough-running test quantity is combined with a dynamic compensation of the individual vector elements in order to avoid a plurality of reference vectors for all load/rpm-pairs which occur for positive and negative accelerations. That is, slow dynamic operations such as the increase of the engine rpm for an acceleration of the motor vehicle are compensated by computer when forming the individual elements of the rough-running vector. In this way, it is possible to carry out a misfire detection also in transient operating states with a realistic number of reference vectors which were formed for steady-state conditions in each case.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
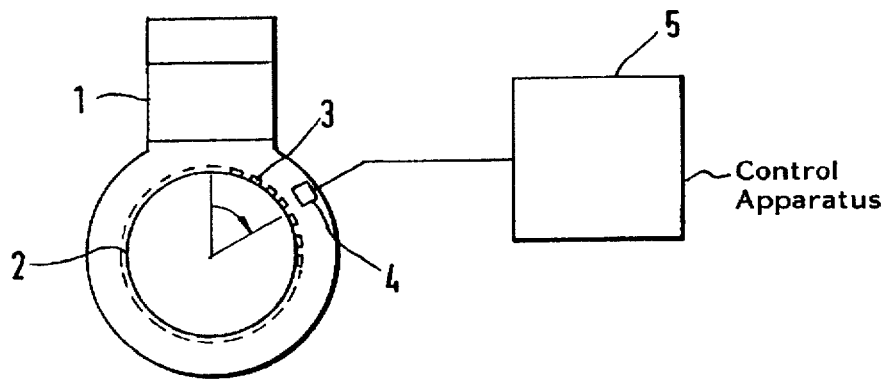
FIG. 1 is a schematic representation of an engine and a control apparatus to show the setting in which the method of the invention is applied.

FIG. 1 shows an internal combustion engine 1 equipped with an angle transducer wheel 2 which carries markings 3 as well as an angle sensor 4 and a control apparatus 5. The angle transducer wheel 2 is coupled to the crankshaft of the internal combustion engine. The rotational movement of the angle transducer wheel 2 is converted into an electrical signal with the aid of the angle sensor 4 embodied as an inductive sensor. The electrical signal has a periodicity which defines an image of the periodic passing of the markings 3 at the angle sensor 4. The time duration between an increase and a drop of a signal level therefore corresponds to the time in which the crankshaft has rotated further through an angular range corresponding to the extent of the markings. The control apparatus 5 is configured as a computer and these time durations are further processed in the computer to a vector element (scalar quantity) Lut for the rough running of the internal combustion engine.

Figure 2:
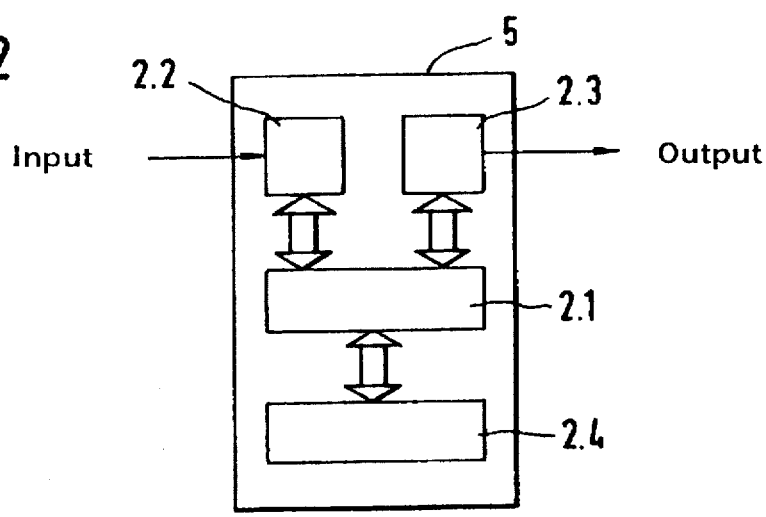
FIG. 2 is a schematic of a computer suitable for carrying out the method of the invention.

Examples of Lut computations are provided further on in this disclosure. The computer used for this purpose, can, for example, be so configured as shown in FIG. 2. According to FIG. 2, a computer unit 2.1 negotiates between an input block 2.2 and an output block 2.3 while using programs and data stored in a memory 2.4.

Figure 3A:
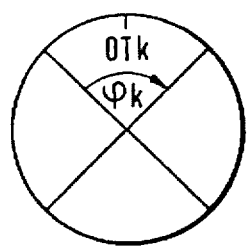
FIGS. 3a and 3b show the known principle for forming the segment times as the basis of a measure or criterion for the rough running on the basis of rpm measurements.

FIG. 3a is exemplary of a subdivision of the angle transducer wheel into four segments wherein each segment has a predetermined number of markings. The marking OTk is that top dead center point of the piston movement of the kth cylinder of an internal combustion engine which, in this embodiment, is an eight-cylinder engine. The top dead center point lies in the combustion stroke of this cylinder. A rotational angular range $\phi k$ is defined about this point and extends in this embodiment over one quarter of the markings of the angle transducer wheel.

In the same manner, angular ranges $\phi 1$ to $\phi 8$ are assigned to the combustion strokes of the remaining cylinders with a four-stroke principle being assumed wherein the crankshaft rotates twice for each complete work cycle. For this reason, the range $\phi 1$ of the first cylinder corresponds to the range $\phi 5$ of the fifth cylinder and so on. The angular ranges corresponding to a rotation of the crankshaft can be separated from each other or they can be mutually adjoining or they can overlap. In the first case, markings are provided which are not assigned to any angular range and in the second case, each marking corresponds precisely to an angular range and, in the third case, respective markings correspond to different angle ranges. Accordingly, any position or length of the angle range is therefore conceivable.

Figure 3B:
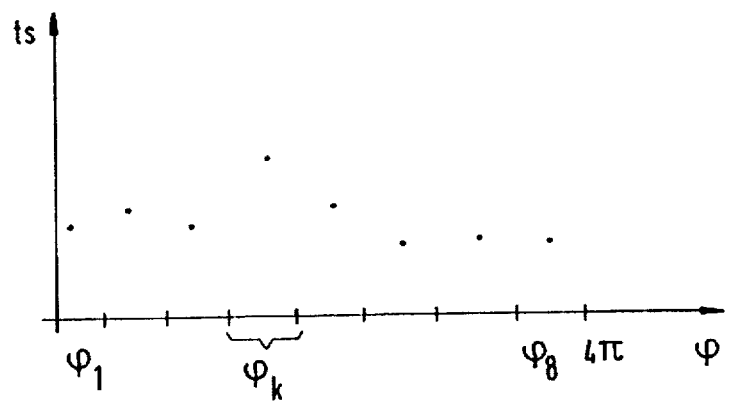

In FIG. 3b, the times (ts) are plotted along the ordinate and these times (ts) are the times in which the angle range is passed through by the rotational movement of the crankshaft. A misfire is assumed in cylinder (k). The torque interruption associated with the misfire leads to an increase of the corresponding time span (ts). The time spans (ts) then already define a measure for the rough running which is in principle suited to detect misfires. The dimension of an acceleration is imparted to the rough-running value by a suitable processing of the time spans (ts) (especially via the formation of the differences between mutually adjacent time spans and by standardizing these differences to the third power of the time span (ts(i)) to an ignition having index (i). The rough-running value then has an improved signal/noise ratio which has been shown empirically.

Figure 4:
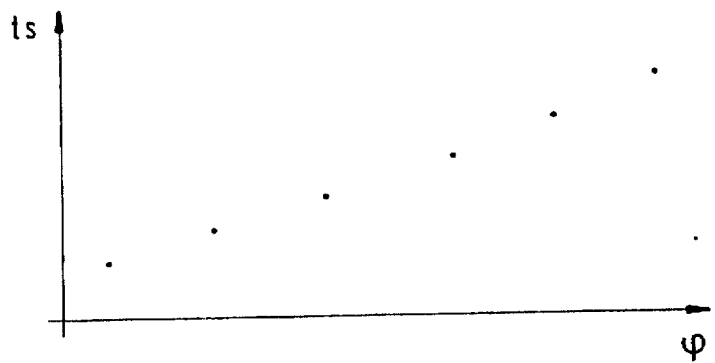
FIG. 4 shows the influence of acceleration on the measurement of segment times.

FIG. 4 shows the influence of the rpm changes on the detection of the time durations (ts). The case shown is for the case of a rpm reduction as is typical of that occurring in the overrun operation of a motor vehicle. This effect manifests itself in a relatively uniform extension of the detected times (ts). To compensate for this effect, it is known, for example, to form a corrective term K and to consider that the extension effect is compensated with the computation of the rough-running value.

Figure 5:
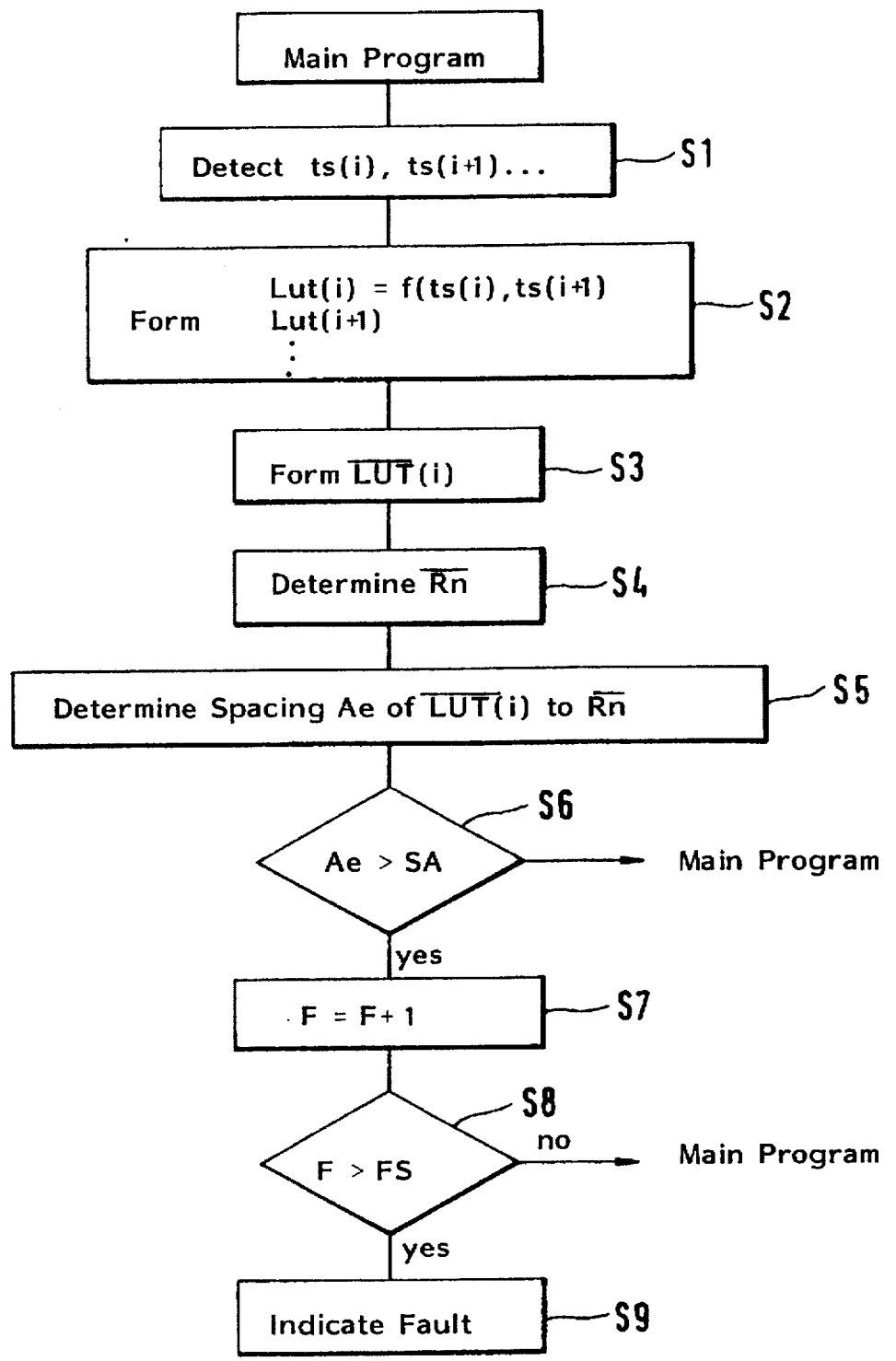
FIG. 5 shows a flowchart of an embodiment of the method of the invention.

FIG. 5 shows an embodiment of the method of the invention in the context of a flowchart. After detecting the segment times ts(i) in step S1, rough-running values Lut(i) are formed as a function of the detected segment times in step S2. The index (i) identifies a specific ignition stroke so that the rough-running values are updated in synchronism with ignition. These individual rough-running values are viewed as elements of a rough-running vector $\overline{LUT}(i)$ in the context of the method of the invention. A rough-running vector $\overline{LUT}(i)$ is formed in step S3 from sequential rough-running values Lut(i), Lut(i+1), . . . . The rough-running vector $\overline{LUT}(i)$ has the configuration expressed in the equation below for an ignition stroke having the index (i) in the embodiment referred to an eight-cylinder engine:

$$\overline{LUT}(i)=(Lut(i), Lut(i+1), \ldots, Lut(i+7))$$

Stated otherwise, a z-dimensional vector is formed for a z-cylinder engine with the rough-running values being considered in each case. These rough-running values are formed during a work operation, that is, a rotation of the camshaft.

Figure 7:
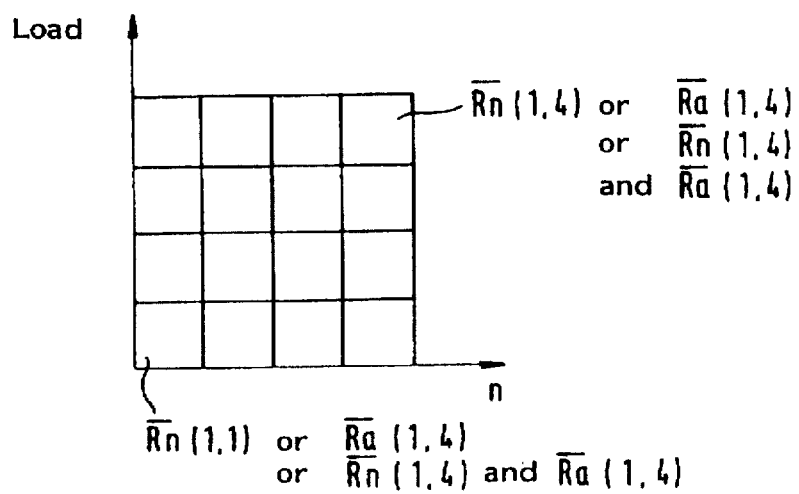

In step S4, a characteristic field is addressed with the values of operating parameters such as load and rpm which are actual at the time point of the ignition (i). Reference vectors, which are individual to the operating points, are stored in the characteristic field. It would be conceivable, for example, to have a 4×4 characteristic field of load and rpm wherein reference vectors:

$$\overline{Rn}=(Rn(i), Rn(i+1), \ldots, Rn(i+7))$$

are stored which are characteristic for misfire-free normal operation. Such a characteristic field is shown in FIG. 7.

Thereafter, a step S5 functions to determine a spacing dimension between the actual rough-running vectors and the reference vectors $\overline{Rn}$. This can, for example, be a euclidian spacing Ae as follows:

$$Ae = \sqrt{(Lut(i) - Rn(i))^2 + \ldots + (Lut(i+7) - Rn(i+7))^2}$$

The use of any other desired spacing dimension is also conceivable as an alternative. If the spacing Ae exceeds a predetermined threshold value SA in step S6, then this is evaluated as the occurrence of a misfire and, for example, a fault counter is incremented in step S7, for example, a variable F is incremented. If the fault number F or the frequency (equaling the fault number per unit of time) with which misfires occur, exceed a predetermined value FS (which is checked in step S8), then this can be shown to the operator of the motor vehicle by switching on a fault lamp in step S9.

The computation of an individual rough-running value Lut(i) can be carried out in step S2 for an ignition stroke having the index (i) wherein the slow dynamic effects are compensated. This can be carried out, for example, in the manner described below.

$$Lut(i)=\text{base term—corrective term } K \text{ for dynamic compensation}$$

$$Lut(i) = \frac{ts(i+1) - ts(i)}{ts(i)^3} - \frac{((ts(i+5) - ts(i-3))/8)}{ts(i)^3}$$

The appropriate rule generalized to (z) cylinders is given as follows:

$$Lut(i) = B - K = \frac{ts(i+1) - ts(i)}{ts(i)^3} -$$

$$\frac{ts\left(i + \left(\frac{z}{2} + 1\right)\right) - ts\left(i - \left(\frac{z}{2} - 1\right)\right)}{ts(i)^3}$$

wherein:

(z)=number of cylinders of the internal combustion engine.

The formation of the rough-running vector $\overline{LUT}(i)$ can be carried out in step S3 in that sequential rough-running values for ignition strokes having indices i, i+1, i+2, . . . are considered as elements of a rough-running vector $\overline{LUT}(i)$. That is, according to the invention, a vector $$\overline{LUT}(i) = (Lut(i), Lut(i+1), \ldots, Lut(i+7))$$

is formed from individual vector elements (scalar quantities) Lut(i) for an ignition having index (i) in an embodiment referred to an eight cylinder engine. The following expression applies generalized to (z) cylinders:

$$\overline{LUT}(i) = (Lut(i), \ldots, Lut(i+z-1))$$

An alternative to this vector formation comprises viewing the segments ts(i) directly as a measure or criterion for the rough running and to form the rough running vector in the following manner:

$$\overline{LUT}(i) = (ts(i), ts(i+1), \ldots, ts(i+z-1))$$

It is also possible to determine the rough-running vector from the differences of segment times as follows:

$$\overline{LUT}(i) = (ts(i+1) - ts(i), ts(i+2) - ts(i+1), \ldots, ts(i+z-1) - ts(i+z-2))$$

Furthermore, it is possible to define the rough-running vector in the following manner as the difference of a base vector $\overline{B}$ and a dynamic-corrective vector $\overline{K}$:

$$\overline{LUT}(i) = \overline{B} - \overline{K}$$

$$\text{with } \overline{B} = \begin{pmatrix} ts(i+1) - ts(i) \\ ts(i+2) - ts(i+1) \\ \vdots \\ ts(i+z-1) - ts(i+z-2) \end{pmatrix},$$

wherein:

$$\text{with } \overline{K} = \begin{pmatrix} (ts(i-p+z) - ts(i-p))/z \\ (ts(i+1-p+z) - ts(i+1-p))/z \\ \vdots \\ (ts(i+z-2-p+z) - ts(i+z-2-p))/z \end{pmatrix}$$

(z)=number of cylinders of the internal combustion engine; and, (p)=fixed value.

In the two embodiments presented above, the times (ts (i+j))/(ts(i)) standardized to the time ts(i) can be used in lieu of the differences ts(i+j)−ts(i+j−1) wherein j=1, 2, . . . , z.

The euclidian spacing Ae:

$$Ae = \sqrt{(Lut(i) - Rn(i))^2 + \ldots + (Lut(i+7) - Rn(i+7))^2}$$

can, for example, be used to form a spacing dimension between the actual rough-running vectors and the reference vectors $\overline{Rn}$ in step S5.

Figure 6:
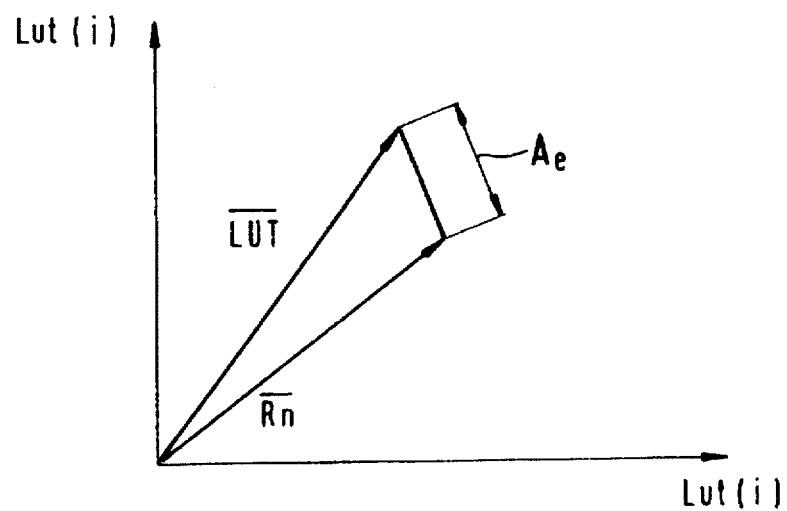
FIG. 6 shows the comparison of vector quantities for detecting misfires according to the method of the invention; and, FIG. 7 shows a collection of operation point individual reference vectors in the context of a 4×4 characteristic field of load and rpm of an internal combustion engine.

The value Ae is shown in FIG. 6 together with a rough-running vector $\overline{LUT}$ and a reference vector $\overline{Rn}$. As an alternative to the steps S4, S5 and S6 shown in FIG. 5, a reference vector $\overline{Ra}$ can be predetermined for each load rpm range. The reference vector $\overline{Ra}$ is characteristic for the operation with misfires. In this case, a misfire is then detected when the spacing between the vector $\overline{LUT}$ of (i) and the corresponding reference vector $\overline{Ra}$ exceeds a predetermined threshold value. The vector $\overline{LUT}$ is formed for an ignition (i).

A comparison to two reference vectors $\overline{Ra}$, $\overline{Rn}$ is another possible alternative. This alternative is characterized in that at least two reference vectors $\overline{Rn}$ and $\overline{Ra}$ are predetermined for each load-rpm range. $\overline{Rn}$ is predetermined for misfire-free normal operation and $\overline{Ra}$ is predetermined for operation with misfires. A misfire is then detected when the spacing to the vector $\overline{LUT}$ of (i) and the vector $\overline{Rn}$ is greater than the distance to the vector $\overline{Ra}$. The vector $\overline{LUT}$ is determined for an ignition (i).

It is understood that the foregoing description is that of the preferred embodiments of the invention and that various changes and modifications may be made thereto without departing from the spirit and scope of the invention as defined in the appended claims.

What is claimed is:

1. A method for detecting combustion misfires in a multicylinder internal combustion engine, the method comprising the steps of:

detecting a time span ts(i) in which the crankshaft of the engine passes through a pregiven angular range ($\phi$) for each ignition of the engine;

computing a vector element Lut(i) for a rough running of the engine based on at least said one detected time span ts(i) for each ignition (i) of the engine;

forming a vector $\overline{LUT}(i)$ from at least two vector elements Lut(i), Lut(j) with said two vector elements Lut(i), Lut(j) being for each ignition (i);

computing a spacing between said vector $\overline{LUT}(i)$ and at least one predetermined reference vector $\overline{Rn}$ and $\overline{Ra}$;

detecting a combustion misfire when said spacing satisfies a predetermined condition;

forming a corrective quantity (K) when computing an individual vector component Lut(i) to correct and compensate for an influence of mean rpm changes of the engine on said time span ts(i); and, considering said corrective quantity (K) when computing an individual vector component.

2. A method for detecting combustion misfires in a multicylinder internal combustion engine, the method comprising the steps of:

detecting a time span ts(i) in which the crankshaft of the engine passes through a pregiven angular range ($\phi$) for each ignition of the engine;

computing a vector element Lut(i) for a rough running of the engine based on at least said one detected time span ts(i) for each ignition (i) of the engine;

forming a vector $\overline{LUT}(i)$ from at least two vector elements Lut(i), Lut(j) with said two vector elements Lut(i), Lut(j) being for each ignition (i);

computing a spacing between said vector $\overline{LUT}(i)$ and at least one predetermined reference vector $\overline{Rn}$ and $\overline{Ra}$;

detecting a combustion misfire when said spacing satisfies a predetermined condition;

utilizing various reference vectors for various load/rpm ranges of the engine;

predetermining a reference vector $\overline{Rn}$ for each load-rpm region which is characteristic for misfire-free normal operation; and, detecting a misfire when a spacing between said vector $\overline{LUT}(i)$, which is formed for an ignition (i), and the reference vector $\overline{Rn}$ corresponding thereto exceeds a predetermined threshold value.

3. A method for detecting combustion misfires in a multicylinder internal combustion engine, the method comprising the steps of:

detecting a time span ts(i) in which the crankshaft of the engine passes through a pregiven angular range ($\phi$) for each ignition of the engine;

computing a vector element Lut(i) for a rough running of the engine based on at least said one detected time span ts(i) for each ignition (i) of the engine;

forming a vector $\overline{LUT}(i)$ from at least two vector elements Lut(i), Lut(j) with said two vector elements Lut(i), Lut(j) being for each ignition (i);

computing a spacing between said vector $\overline{LUT}(i)$ and at least one predetermined reference vector $\overline{Rn}$ and $\overline{Ra}$;

detecting a combustion misfire when said spacing satisfies a predetermined condition;

utilizing various reference vectors for various load/rpm ranges of the engine;

predetermining a reference vector $\overline{Ra}$ for each load-rpm region which is characteristic for operation with misfires; and, detecting a misfire when a spacing between the vector $\overline{LUT}(i)$, which is formed for an ignition (i), and the reference vector $\overline{Ra}$ corresponding thereto exceeds a predetermined threshold value.

4. A method for detecting combustion misfires in a multicylinder internal combustion engine, the method comprising the steps of:

detecting a time span ts(i) in which the crankshaft of the engine passes through a pregiven angular range ($\phi$) for each ignition of the engine;

computing a vector element Lut(i) for a rough running of the engine based on at least said one detected time span ts(i) for each ignition (i) of the engine;

forming a vector $\overline{LUT}(i)$ from at least two vector elements Lut(i), Lut(j) with said two vector elements Lut(i), Lut(j) being for each ignition (i);

computing a spacing between said vector $\overline{LUT}(i)$ and at least one predetermined reference vector $\overline{Rn}$ and $\overline{Ra}$;

detecting a combustion misfire when said spacing satisfies a predetermined condition;

utilizing various reference vectors for various load/rpm ranges of the engine;

predetermining at least two reference vectors $\overline{Rn}$ and $\overline{Ra}$ for each load-rpm region with reference vector $\overline{Rn}$ being for misfire-free normal operation and reference vector $\overline{Ra}$ being for operation with misfires; and, detecting a misfire when a spacing between the vector $\overline{LUT}(i)$, which is formed for ignition (i), and the vector $\overline{Rn}$ is greater than the spacing between the vector $\overline{LUT}(i)$ and the vector $\overline{Ra}$.

5. The method of claim 1, comprising a further step of subtracting the corrective quantity (K) from a base term (B) to compute an individual vector component Lut(i) wherein said base term (B) and said corrective term (K) are each formed from individual assigned times ts(i–j), ..... ts(i), ... . , ts(i+j).

6. The method of claim 5, wherein vector component Lut(i) is given as:

$$Lut(i) = B - K = \frac{ts(i+1) - ts(i)}{ts(i)^3} - \frac{ts\left(i+\left(\frac{z}{2}+1\right)\right) - ts\left(i-\left(\frac{z}{2}-1\right)\right)}{ts(i)^3}$$

wherein:

(z)=number of cylinders of the engine.

7. A method for detecting combustion misfires in a multicylinder internal combustion engine, the method comprising the steps of:

detecting a time span ts(i) in which the crankshaft of the engine passes through a pregiven angular range ($\phi$) for each ignition of the engine;

computing a vector element Lut(i) for a rough running of the engine based on at least said one detected time span ts(i) for each ignition (i) of the engine;

forming a vector $\overline{LUT}(i)$ from at least two vector elements Lut(i), Lut(j) with said two vector elements Lut(i), Lut(j) being for each ignition (i);

computing a spacing between said vector $\overline{LUT}(i)$ and at least one predetermined reference vector $\overline{Rn}$ and $\overline{Ra}$;

detecting a combustion misfire when said spacing satisfies a predetermined condition; and, the vector $\overline{LUT}(i)$ is given as:

$$\overline{LUT}(i) = (Lut(i), \ldots, Lut(i+z-1))$$

wherein:

(z)=number of cylinders of the engine.

8. A method for detecting combustion misfires in a multicylinder internal combustion engine, the method comprising the steps of:

detecting a time span ts(i) in which the crankshaft of the engine passes through a pregiven angular range ($\phi$) for each ignition of the engine;

computing a vector element Lut(i) for a rough running of the engine based on at least said one detected time span ts(i) for each ignition (i) of the engine;

forming a vector $\overline{LUT}(i)$ from at least two vector elements Lut(i), Lut(j) with said two vector elements Lut(i), Lut(j) being for each ignition (i);

computing a spacing between said vector $\overline{LUT}(i)$ and at least one predetermined reference vector $\overline{Rn}$ and $\overline{Ra}$;

detecting a combustion misfire when said spacing satisfies a predetermined condition; and, detecting a plurality of time spans ts(i) and directly supplying a criterion for rough running and forming the vector $\overline{LUT}(i)$ as:

$$\overline{LUT}(i) = (ts(i), ts(i+1), \ldots, ts(z-1))$$

wherein:

(z)=number of cylinders of the engine.

9. A method for detecting combustion misfires in a multicylinder internal combustion engine, the method comprising the steps of:

- detecting time spans ts(i) in which the crankshaft of the engine passes through a pregiven angular range ($\phi$) for each ignition of the engine;
- computing a vector element Lut(i) for a rough running of the engine based on at least said one detected time span ts(i) for each ignition (i) of the engine;
- forming a vector $\overline{LUT}(i)$ from at least two vector elements Lut(i), Lut(j) with said two vector elements Lut(i), Lut(j) being for each ignition (i);
- computing a spacing between said vector $\overline{LUT}(i)$ and at least one predetermined reference vector $\overline{Rn}$ and $\overline{Ra}$;
- detecting a combustion misfire when said spacing satisfies a predetermined condition;
- forming differences of said time spans ts(i) as a criterion for the rough running; and,
- forming the vector $\overline{LUT}(i)$ as $$\overline{LUT}(i) = (ts(i+1) - ts(i), ts(i+z) - ts(i+1), \ldots, ts(i+z-1) - ts(i+z-2))$$

wherein:

(z)=number of cylinders of the engine.

10. The method of claim 5, wherein the vector $\overline{LUT}(i)$ is formed as:

$$\overline{LUT}(i) = \bar{B} - \bar{K}$$

$$\text{with } \bar{B} = \begin{pmatrix} ts(i+1) - ts(i) \\ ts(i+2) - ts(i+1) \\ \cdot \\ \cdot \\ ts(i+z-1) - ts(i+z-2) \end{pmatrix},$$

$$\text{with } \bar{K} = \begin{pmatrix} (ts(i-p+z) - ts(i-p))/z \\ (ts(i+1-p+z) - ts(i+1-p))/z \\ \cdot \\ \cdot \\ (ts(i+z-2-p+z) - ts(i+z-2-p))/z \end{pmatrix}$$

wherein:

(z)=number of cylinders of the internal combustion engine; and, (p)=fixed value.

11. The method of claim 9, comprising the step of utilizing times (ts(i+j))/(ts(i)), which are standardized to ts(i), in lieu of the differences ts(i+j)–ts(i+j–1) wherein j=1, 2, . . . , z.

* * * * *